United States Patent
Lee

(10) Patent No.: US 10,627,008 B2
(45) Date of Patent: Apr. 21, 2020

(54) COOLANT CONTROL VALVE UNIT

(71) Applicants: HYUNDAI MOTOR COMPANY, Seoul (KR); KIA MOTORS CORPORATION, Seoul (KR)

(72) Inventor: Hyo Jo Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/982,365

(22) Filed: May 17, 2018

(65) Prior Publication Data

US 2019/0128442 A1 May 2, 2019

(30) Foreign Application Priority Data

Nov. 1, 2017 (KR) .................... 10-2017-0144601

(51) Int. Cl.
| | | |
|---|---|---|
| *F16K 31/524* | (2006.01) | |
| *F16K 11/10* | (2006.01) | |
| *F01P 3/02* | (2006.01) | |
| *F01P 7/16* | (2006.01) | |
| *F02M 26/28* | (2016.01) | |
| *F02M 26/66* | (2016.01) | |

(Continued)

(52) U.S. Cl.
CPC ......... *F16K 31/52408* (2013.01); *F01P 3/02* (2013.01); *F01P 7/165* (2013.01); *F02M 26/28* (2016.02); *F02M 26/66* (2016.02); *F16K 11/10* (2013.01); *F01P 2003/027* (2013.01); *F01P 2007/146* (2013.01); *F02M 26/06* (2016.02)

(58) Field of Classification Search
CPC .... F16K 31/52408; F16K 11/10; F16K 31/52; F16K 31/522; F16K 31/52485; F01P 2007/146; F01P 3/02; F01P 7/165; F02M 26/66; F02M 26/28
See application file for complete search history.

(56) References Cited

U.S. PATENT DOCUMENTS

| | | | | |
|---|---|---|---|---|
| 2,206,869 A | * | 7/1940 | Banker | ...................... F01L 1/16 |
| | | | | 123/90.49 |
| 2017/0058753 A1 | * | 3/2017 | Lee | .......................... F01P 7/14 |
| 2017/0145896 A1 | | 5/2017 | Lee | |

FOREIGN PATENT DOCUMENTS

| | | |
|---|---|---|
| CH | 392271 A | 5/1965 |
| KR | 10-1734246 B1 | 5/2017 |
| KR | 10-1744834 B1 | 6/2017 |

OTHER PUBLICATIONS

Extended European Search Report of corresponding Patent Application No. 18174797.3—9 pages (dated Dec. 11, 2018).

* cited by examiner

*Primary Examiner* — Jacob M Amick
(74) *Attorney, Agent, or Firm* — Morgan, Lewis & Bockius LLP

(57) ABSTRACT

A coolant control valve unit for a vehicle engine is disclosed. The coolant control valve unit includes a rod at one side of which a valve opening and closing a coolant passage, a cap at which a rod groove into which one end of the rod is inserted is provided, a cap elastic member inserted inside the rod groove to elastically support one end of the rod outwardly, a cam with one surface of which a driving axle is connected and at the other surface of which at least one of pressing surface is provided in a rotational direction with respect to a rotational center portion, and a valve elastic (Continued)

member elastically supporting the valve to one side so that the cap contacts with the pressing surface.

8 Claims, 3 Drawing Sheets

(51) Int. Cl.
*F01P 7/14* (2006.01)
*F02M 26/06* (2016.01)

COOLANT CONTROL VALVE UNIT

CROSS-REFERENCE TO RELATED APPLICATION

This application claims priority to and the benefit of Korean Patent Application No. 10-2017-0144601 filed in the Korean Intellectual Property Office on Nov. 1, 2017, the entire contents of which are incorporated herein by reference.

BACKGROUND

(a) Field

The present disclosure relates to a coolant control valve unit in which coolant is supplied to a cylinder block and a cylinder head and the supplied coolant is distributed to cooling components to reduce warming-up time of an engine and fuel consumption.

(b) Description of Related Art

The engine generates a torque by burning fuel, and exhausts the remainder in thermal energy. Particularly, coolant absorbs heat while circulating the engine, and dissipates the heat to an outside of the engine through a radiator.

If a coolant temperature of the engine is low to elevate oil viscosity, it is a trend that friction force and fuel consumption increases and a temperature of exhaust gas rises slowly resulting to prolong a time period of catalyst activation to make a quality of the exhaust gas poor. Along with this, there is a trend that a time period for bringing a heater function to a normal level takes a long time.

If the coolant temperature of the engine is excessive, knocking takes place, and, if ignition timing is adjusted for suppressing the knocking, performance is liable to become poor. And, if a lubrication oil temperature is excessive, a lubrication action is liable to become poor.

The above information disclosed in this Background section is only for enhancement of understanding of background of the invention. Applicant notes that this section may contain information available before this application. However, by providing this section, Applicant does not admit that any information contained in this section constitutes prior art.

SUMMARY

The present disclosure has been made in an effort to provide a coolant control valve which improves control precision of the coolant and reliability of control and reduces maintenance and repairing cost by reducing abrasion between the cam and rods of valves.

A single coolant control valve is applied to control several cooling elements such that a temperature of coolant in a particular portion of a vehicle engine is maintained to be high and a temperature of a coolant in another portion of the vehicle engine is maintained to be low.

For the single coolant control valve unit, a plurality of valves are disposed and a cam for controlling lifting action of these valves is provide to control the coolant distribution to a radiator, a heater, and an oil cooler of a vehicle.

Friction abrasion may occur, therefore control precision and durability may be deteriorated and maintenance cost may increase.

A coolant control valve unit according to an embodiment of the present invention may include a rod at one side of which a valve opening and closing a coolant passage, a cap at which a rod groove into which one end of the rod is inserted is provided, a cap elastic member inserted inside the rod groove to elastically support one end of the rod outwardly, a cam with one surface of which a driving axle is connected and at the other surface of which at least one of pressing surface is provided in a rotational direction with respect to a rotational center portion, and a valve elastic member elastically supporting the valve to one side so that the cap contacts with the pressing surface.

The driving axle may be connected with the rotational center portion of the cam.

A rounding portion having a predetermined curvature between a surface contacting with the pressing surface and a side surface may be provided.

A stopper may be provided to be protruded at the side surface of the rod at an insertion portion of the rod groove.

A stopper groove into which the stopper is inserted may be provided at an inner circumference of the cap.

The stopper groove may be provided to a predetermined distance in a lengthwise direction of the rod so that the cap moves to the predetermined distance in the lengthwise direction of the rod.

The coolant control valve unit may further include an actuator rotating the cam by the driving axle and of which the pressing surface presses the cap so that the valve provided to the rod opens and closes the coolant passage.

An engine cooling system according to an embodiment of the present invention may include a cylinder block, a cylinder head disposed on the cylinder block, and the coolant control valve unit according to claim 1 disposed at a coolant outlet of the cylinder head, to which the coolant discharged from the cylinder head and the cylinder block is supplied, and distributing the supplied coolant to coolant components.

The coolant components include a low pressure EGR (exhaust gas recirculation) cooler cooling exhaust gas recirculating from an exhaust line to intake line, a heater disposed to warm up interior air of a vehicle, and a radiator radiating heat of the coolant to outside.

The coolant components may further include an EGR valve installed to an EGR line to control flow rate of recirculating exhaust gas, and an oil cooler disposed to cool oil circulating the cylinder block and the cylinder head.

According to an embodiment of the present invention, the pressing surface and the rod do not directly slide with each other but the cap slides with the pressing surface, therefore abrasion of the rod may be fundamentally removed.

Further, the whole rod and valve are not replaced, but only the cap is replaced, therefore complication is removed, and shock applied to the rod may be absorbed by the cap elastic member to reduce breakage and bending of the rod.

DESCRIPTION OF SYMBOLS

Figure 1:
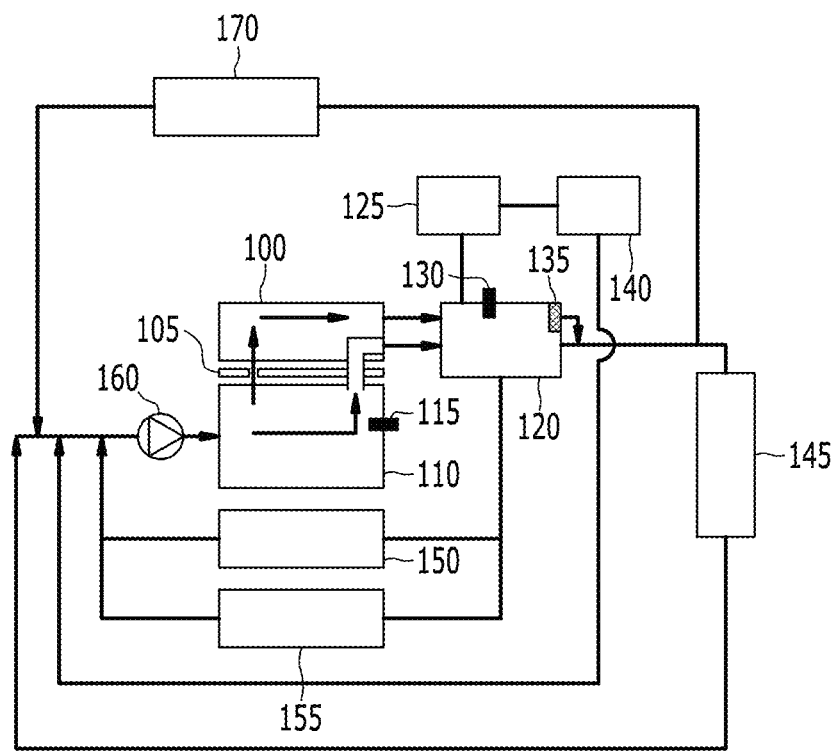
FIG. 1 is a schematic diagram of an engine cooling system according to an embodiment of the present invention.

120: coolant control valve unit 300: cam
302: pressing surface 310: actuator 312: driving axle 320: valve
322: rod 324: valve elastic member
326: supporting member 328: sealing member
400: cap 405: stopper
410: stopper groove 415: cap elastic member
417: rod groove 420: rounding portion

DETAILED DESCRIPTION

Hereinafter, certain embodiments of the present invention will be described in detail with reference to the accompanying drawings.

Since sizes and thicknesses of elements in the drawings are arbitrarily represented for convenience sake, the present invention is not limited to illustrations of the drawings. In order to clearly express portions and regions, thicknesses may be exaggerated.

However, certain parts which are not related with the description may be omitted, and the same reference numerals were given for same or similar elements.

In the following description, dividing names of components into first, second, and the like is to divide the names because the names of the components are the same as each other, and an order thereof is not particularly limited.

An aspect of the present invention provides a coolant valve device 120 for controlling coolant flow for an engine of a vehicle. In embodiments, the coolant valve device 120 comprises a plurality of valve elements 320, each configured to open or close a corresponding coolant passage. Each valve element 320 is connected to one end of a corresponding valve driving rod 322. The other end of the rod 322 is connected to cap 400. The cap 400 contacts a cam surface 302 such that the rod 322 moves up and down along its longitudinal direction as the cap slides along the cam surface 302 according to rotation of the cam 300.

In embodiments, valve element 320 is supported by a first spring 324 connected to a supporting member 326 that is fixed to a housing of the coolant valve device 120. Further, a second spring is interposed between cap 400 and rod 322 such that, along the rod's longitudinal direction, cap 400, second spring 417, rod 322, valve elements 320, first spring 324 are arranged in order. In certain embodiments, one end of the first spring 324 is connected to the valve and the other end is fixed directly, without a separate supporting member 326, to a housing of the coolant valve device 120.

FIG. 1 is a schematic diagram of an engine cooling system according to an exemplary embodiment of the present invention.

Referring to FIG. 1, an engine cooling system includes a cylinder head 100, a head gasket 105, a cylinder block 110, a block coolant temperature sensor 115, a coolant control valve unit 120, a valve coolant temperature sensor 115, a safety valve 135, a reservoir tank 170, a low pressure EGR (exhaust gas recirculation) cooler 125, a heater core 140, a radiator 145, an EGR valve 150, an oil cooler 155, and a coolant pump 160.

The cylinder head 100 is disposed on the cylinder block 110, and the head gasket 105 is interposed between them.

The coolant pump 160 may be mounted at one side of the cylinder block 110, and the coolant control valve unit 120 may be mounted at the other side of the cylinder head 100.

Coolant pumped by the coolant pump 160 is supplied to an inner one side of the cylinder block 110. Some of the coolant pumped to the cylinder block 110 passes through the head gasket 105 to an inner one side of the cylinder head 100, and the remaining flows to an inner the other side of the cylinder block 110.

The coolant flowed to the other side in the cylinder block 110 rises to pass through the head gasket 105 and may be supplied to the coolant control valve unit 120 engaged to the other side of the cylinder head 100.

The coolant supplied to the inner one side of the cylinder head 100 flows to the inner other side of the cylinder head 100 and is supplied to the coolant control valve unit 120 mounted at the other side of the cylinder head 100.

The coolant control valve unit 120 may control the coolant discharged through the cylinder block 110, and the coolant discharged through the cylinder head 100 recirculates to the coolant control valve unit 120 according to operation of the coolant pump 160.

The block coolant temperature sensor 115 detecting a coolant temperature passing through the cylinder block 110 is provided in the cylinder block 110, and the valve coolant temperature sensor 130 detecting a coolant temperature passing through the coolant valve unit 120 is provided in the coolant valve unit 120.

The coolant control valve unit 120 controls the coolant distributed to the low pressure EGR cooler 125 and the heater core 140, controls the coolant distributed to the radiator 145, and always distributes the coolant to the low pressure EGR cooler 125 and the oil cooler 155.

An EGR line (not illustrated) which diverges at a downstream of a turbocharger (not illustrated) and joining to the intake line is provided. The low pressure EGR cooler 125 is provided on the EGR line to cool the EGR gas, and the heater core 140 is provided to warm up interior air of a vehicle.

The radiator 145 is disposed to radiate heat of the coolant to outside, the EGR valve 150 is disposed to control flow rate of the EGR gas, and the oil cooler is disposed to cool oil circulating the engine.

The reservoir tank 170 is disposed on a separate line diverging from a cooling line connected with the radiator from the cooling control valve unit 120, and the reservoir tank 170 collects bubble included in the coolant or supplements the coolant to the cooling system.

The safety valve 135 is a thermostat operating by coolant temperature, and opens a bypass passage connected with the radiator 145 if the coolant is overheated when the coolant control valve unit 120 is out of order. Accordingly, the coolant circulates to the radiator 145 when the safety valve 135 operates.

In an exemplary embodiment of the present invention, coolant components are elements substantially using the coolant, and the coolant components may include a cylinder head, a cylinder block, an oil cooler, an EGR cooler, a heater core, a radiator, a transmission oil warmer, and an EGR valve etc.

Figure 2:
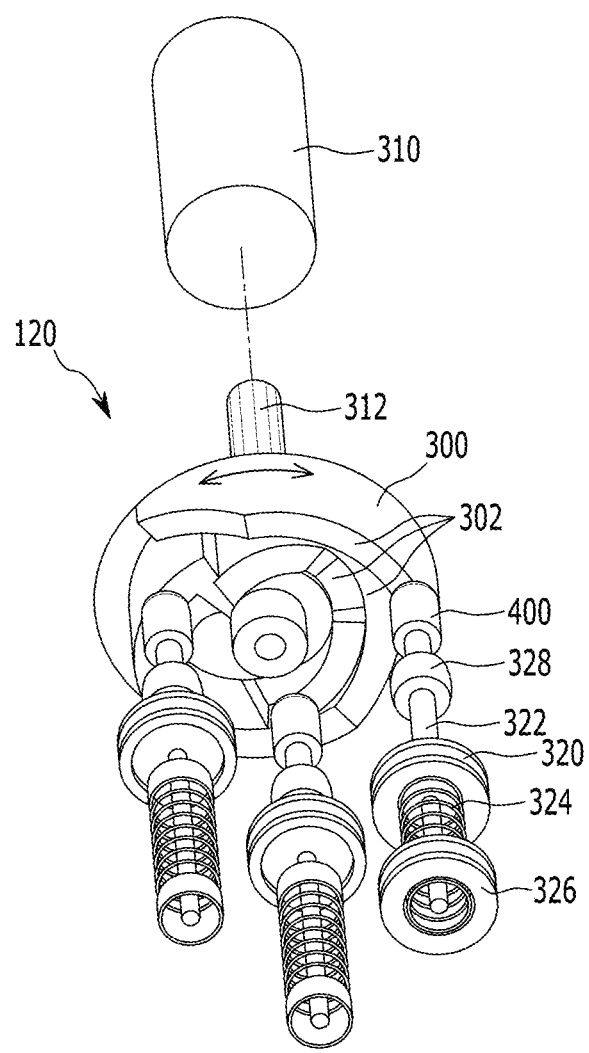
FIG. 2 is a partial perspective view of a coolant control valve unit according to an embodiment of the present invention.

FIG. 2 is a partial perspective view of a coolant control valve unit according to an exemplary embodiment of the present invention.

Referring to FIG. 2, the coolant control valve unit 120 includes an actuator 310, a driving axle 312, a cam 300, a pressing surface 302, a cap 400, a rod 322, a sealing member 328, a valve 320, a valve elastic member 324, and a supporting member 326.

The driving axle 312 is connected with a center portion of an upper surface of the cam 300, and the actuator 310 may rotate the cam 300 by the driving axle 312.

The pressing surface 302 is formed as three rows on a lower surface of the cam 300 with respect to a rotational center portion, and the rod 322 and the valve 320 are provided corresponding to the respective pressing surface 302.

The upper end of the rod 322 is inserted into a lower portion of the cap 400, and an upper surface of the cap 400 contacts with the pressing surface 302 provided at the cam 300.

The valve 320 is provided at one side of the rod 322, and the valve elastic member 324 (a spring interposed between valve 320 and supporting member 326) elastically supports the lower surface of the valve upwardly so that the rod 322 contacts the cap 400 with the pressing surface 302.

Figure 3:
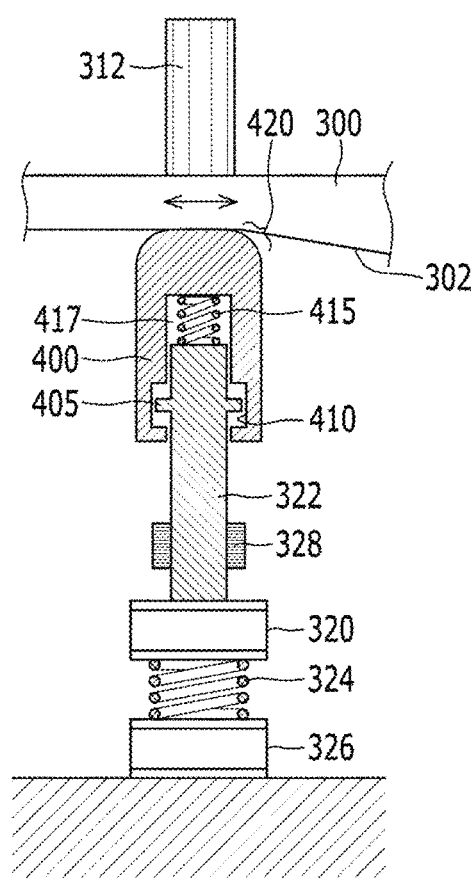
FIG. 3 is a partial cross-sectional view of a coolant control valve unit according to an embodiment of the present invention.

FIG. 3 is a partial cross-sectional view of a coolant control valve unit according to an exemplary embodiment of the present invention.

Referring to FIG. 3, the coolant control valve unit 120 includes a driving axle 312, a cam 300, a pressing surface 302, a cap 400, a cap elastic member 415, a rod 322, a stopper 405, and a stopper groove 410.

A rod groove 417 is provided at the cap 400 to be opened downwardly, and the stopper groove 410 is provided at an inner circumference of the rod groove 417.

The upper end of the rod 322 is inserted into inside of the rod groove 417, the stopper 405 protrudes from an outside surface of the rod 322 at the insertion portion received by internal space of the cap 400. Further, the stopper 405 is inserted into the stopper groove 410.

The stopper groove 410 may be provided at predetermined distance in a movement direction of the rod 322 such that the rod 322 moves in upper and lower directions with respect to the cap 400.

The upper surface of the cap 400 slides with the pressing surface 302 of the cam 300, and a rounding portion 420 having a predetermined radius in a side surface direction is provided on the upper surface of the cap 400.

According to an exemplary embodiment of the present invention, the pressing surface 302 and the rod 322 do not directly slide (contact) with each other but the cap 400 slides (contacts) with the pressing surface 302, therefore abrasion of the rod 322 may be fundamentally removed.

Further, the whole rod 322 and valve 320 are not replaced, but only the cap 400 is replaced, therefore complication is removed, and shock applied to the rod 322 may be absorbed by the cap elastic member 415 to reduce breakage and bending of the rod 322.

While this invention has been described in connection with certain embodiments of the invention, it is to be understood that the invention is not limited to the disclosed embodiments. On the contrary, it is intended to cover various modifications and equivalent arrangements included within the spirit and scope of the appended claims.

What is claimed is:

1. A coolant control valve unit, comprising:
   a valve opening and closing a coolant passage;
   a rod comprising a first end coupled to the valve and a second end;
   a cap comprising a rod recess in which the second end of the rod is inserted;
   a cap elastic member inserted inside the rod recess to elastically support the rod;
   a cam rotatable about an axis, the cam comprising at least one pressing surface contacting the cap; and
   a valve elastic member elastically supporting the valve so that the cap contacts with the pressing surface;
   wherein the rod comprises an inserted portion inserted in the rod recess and a stopper protruding from a side surface of the inserted portion,
   wherein the cap comprises an inner wall of the rod recess, and the inner wall comprises a stopper groove in which the stopper is located, and
   wherein at least a portion of the stopper is always located below and above the stopper groove.

2. The coolant control valve unit of claim 1, further comprising:
   a driving axle is connected with a rotational center portion of the cam.

3. The coolant control valve unit of claim 1,
   wherein the cap comprises a rounding portion having a predetermined curvature between a surface contacting with the pressing surface and a side surface.

4. The coolant control valve unit of claim 1,
   wherein the stopper groove is provided to have a predetermined distance in a lengthwise direction of the rod so that the cap moves with respect to the rod up to the predetermined distance in the lengthwise direction of the rod.

5. The coolant control valve unit of claim 2, further comprising:
   an actuator rotating the cam by the driving axle, wherein the pressing surface presses the cap so that the valve coupled to the rod opens and closes the coolant passage.

6. An engine cooling system, comprising:
   a cylinder block;
   a cylinder head disposed on the cylinder block; and
   the coolant control valve unit according to claim 1 disposed at a coolant outlet of the cylinder head, wherein coolant discharged from the cylinder head and the cylinder block is supplied to the coolant outlet, and distributed to coolant components.

7. The engine cooling system of claim 6, wherein the coolant components include:
   a low pressure EGR (exhaust gas recirculation) cooler cooling exhaust gas recirculating from an exhaust line to an intake line;
   a heater disposed to warm up interior air of a vehicle; and
   a radiator radiating heat of the coolant to outside.

8. The engine cooling system of claim 7, wherein the coolant components further include:
   an EGR valve installed to an EGR line to control flow rate of recirculating exhaust gas; and
   an oil cooler disposed to cool oil circulating the cylinder block and the cylinder head.

* * * * *